United States Patent [19]

Harper

[11] Patent Number: 5,771,385
[45] Date of Patent: Jun. 23, 1998

[54] SETTING AND GETTING SYSTEM DEBUG FLAGS BY NAME AT RUNTIME

[75] Inventor: James M. Harper, Colorado Springs, Colo.

[73] Assignee: Sun Microsystems, Inc., Palo Alto, Calif.

[21] Appl. No.: 623,884

[22] Filed: Mar. 29, 1996

[51] Int. Cl.$^6$ .................................................. G06F 9/44
[52] U.S. Cl. .......................................... 395/704; 395/682
[58] Field of Search ..................................... 395/704, 682

[56] References Cited

U.S. PATENT DOCUMENTS

| | | | |
|---|---|---|---|
| 4,819,234 | 4/1989 | Huber | 371/19 |
| 5,386,522 | 1/1995 | Evans | 395/400 |
| 5,386,565 | 1/1995 | Tanaka et al. | 395/700 |
| 5,602,729 | 2/1997 | Krueger et al. | 395/704 |
| 5,603,033 | 2/1997 | Joannin | 395/704 |

OTHER PUBLICATIONS

"A Real–Time Integrated Environment for Motorola 680xx–based VME and FASTBUS Modules", Berg et al., IEEE Trans. on Nuclear Sci, vol. 36 No. 5 Oct. 1989, pp. 1701–1705.

*Primary Examiner*—Edward R. Cosimano
*Assistant Examiner*—Kakali Chaki
*Attorney, Agent, or Firm*—Homer L. Knearl; William J. Kubida; Holland & Hart LLP

[57] ABSTRACT

In a computing system, debug flags for software development, testing, and debugging of a module of the operating system are retrieved and set. The module under development is provided with a debugging message handler and a lookup table of debugging flags. The table maps the debugging flags to memory locations containing the present state of the flags. A debugging message is generated at the application-level by a user desiring to monitor or alter the state of the debugging flags. The debugging message handler decodes the debugging message using the table, and the module reports or alters the debugging flag accordingly. In this manner, real-time program evaluation and control can be achieved without the conventional debugging software packages.

16 Claims, 6 Drawing Sheets

SETTING AND GETTING SYSTEM DEBUG FLAGS BY NAME AT RUNTIME

BACKGROUND OF THE INVENTION

1. Field of the Invention

The present invention relates to debugging a module of the operating system in a computer. More particularly, the invention relates to a method to set and query debug flags established in a module of the operating system without the need for the use of traditional software debugging tool kits.

2. Description of Prior Art

Software development is an iterative process involving numerous tests of and changes to the software being developed. In order to assist software developers in testing the operation of new software routines or modules, many conventional software debugging tools and platforms provide the developer with information about the operation of the software being developed. For example, flags or registers maintained by the operating system can be examined with most conventional debugging software. These flags provide the software developer with information of the state of the computing system as affected by the software under development.

While debugging information is available through the use of a conventional debugging program, these debugging flags cannot be examined without first loading debugging software to the normal operation of a computing system. Further, once the debugging software is resident in the operating system and the program to be debugged is operating, these flags cannot be accessed without first interrupting the program and entering the debugging software. Finally, conventional debugging software requires the creation and maintenance of a symbol table, outside of the program under development, to monitor the state of such debug flags.

For example, software developers writing virtual device drivers, known as VxDs, for Microsoft Windows[1] can utilize a debugger such as Soft-ICE[2] which must be loaded prior to loading and executing Windows. Being a device driver, a VxD is a software module of the operating system which is used to control a hardware device of the computing system.

[1] Microsoft Windows is a trademark of the Microsoft Corporation.
[2] Soft-ICE is a trademark of the Nu-Mega Corporation.

Figure 1:
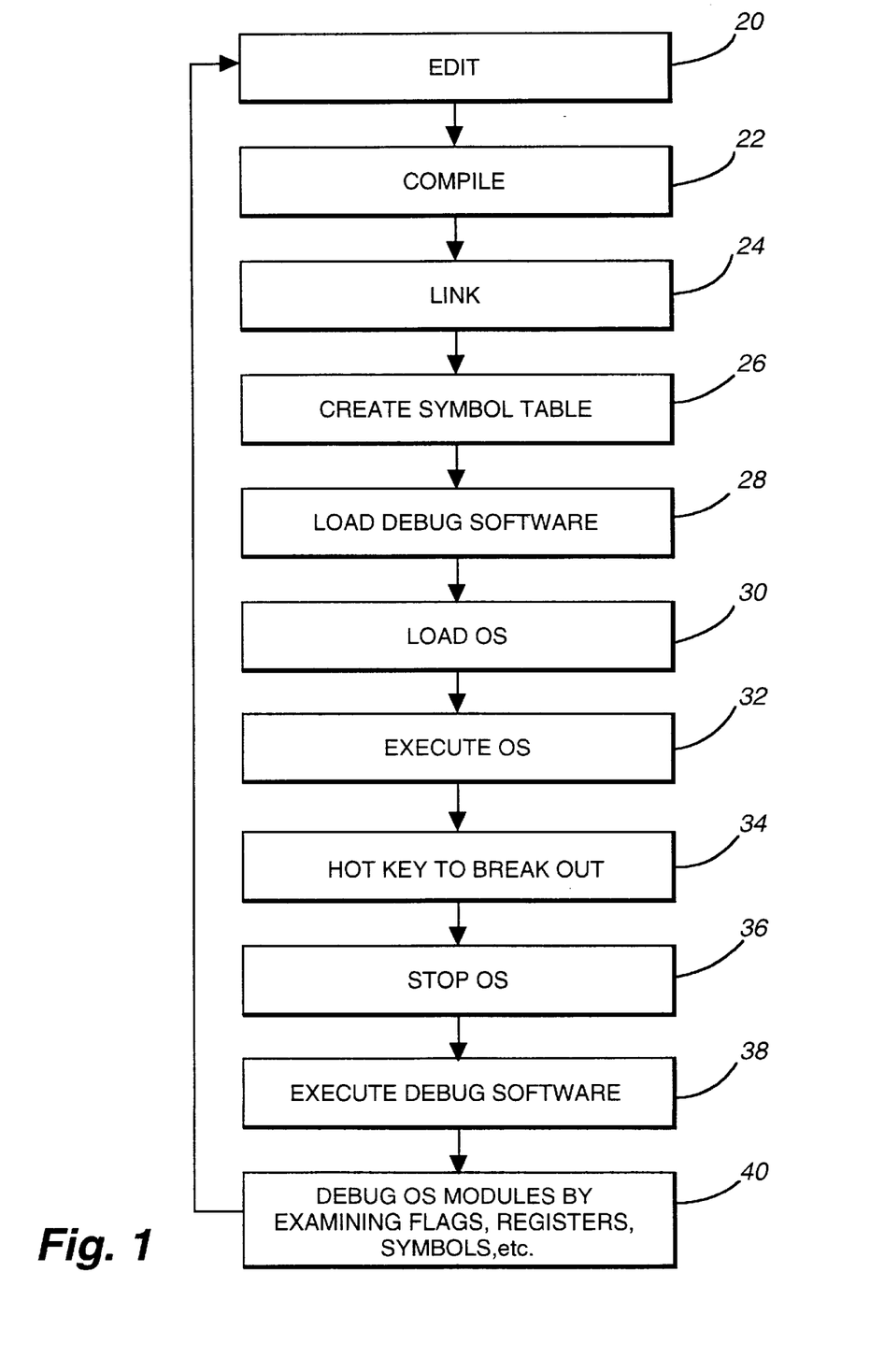
FIG. 1 illustrates the operations required to debug software using conventional methods.

FIG. 1 shows the conventional sequence used to debug VxD modules of the operating system. Conventional debugging begins by editing the program at operation 20, compiling and linking the program at operations 22–24, and creating a symbol table used by the debugger at operation 26 to track state changes in the computing system. At operation 28, the debugging software is loaded prior to loading the operating system software at operation 30. In other words, the operating system must be loaded on top of the debugging software in order to debug modules of the operating system using conventional debuggers.

At operation 32, the operating system, including the VxD module to be tested, is executed and at operation 34, a hot key of the debugging software is used to break out of the operating system so that the flags established at operation 26 can be examined.

At operation 38, the software developer enters the debugging software and examines the contents of the various registers and flags at operation 40. Based on the information provided by the registers and flags, the developer would modify appropriately the software module being developed at operation 20, and the process of FIG. 1 would continue until a satisfactory result is achieved.

Figure 2:
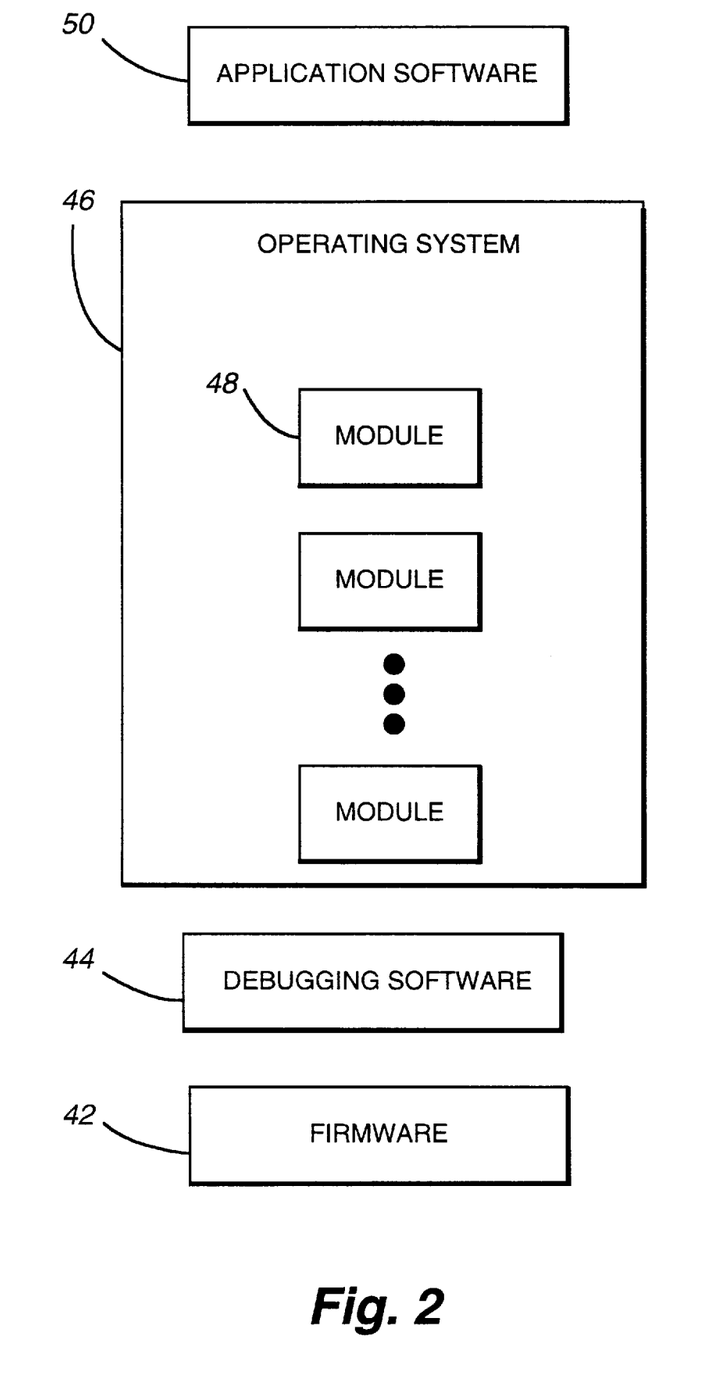
FIG. 2 illustrates the conventional use of debugging software in relation to the components of a computing system.

FIG. 2 illustrates the order in which software is loaded into a computing system for debugging or program development. Debugging software 44 is first loaded to communicate with firmware 42 of the computing system. The operating system 46, composed of modules such as VxD device drivers, is then loaded on top of debugging software 44. Finally, application software 50 is loaded on top of the operating system.

A software developer cannot, using conventional debugging tools, debug software modules of the operating system without loading debugging software 44 into the computing system.

SUMMARY OF THE INVENTION

In accordance with this invention, the above problem has been solved in a computing system by setting and getting system debug flags by name at runtime. In a method implementation of the invention, a sequence of computer-implemented steps perform the following operations. A table of all debug flags to be examined or altered is built along with the respective memory addresses of these debug flags. The table is contained in and accessed by the software module being developed. The module further contains a debugging message handler used to receive and transmit information to and from application programs based on the state of the debug flags maintained in the table of the module. An application-level program or interface accepts user input to query and/or set the debug flags maintained by the software module under development. In this manner, the present invention removes the need for an external debugging software tool kit to be used or loaded into the computing system.

Specifically, the table of debugging flags is maintained in the module for examination by an external application-level program. Each one of the debugging flags has a state and a location in the memory of the computing system. The table maps each one of the debugging flags to the location of the debugging flag in the memory of the computing system. A debugging message is passed from the application-level interface to the module, where the debugging message directs the module to report or alter the state of one of the debugging flags. The module under development receives the debugging message and decodes the debugging message. The module then reports or alters the state of the particular debugging flag responsive to the debugging message.

The above computer implemented steps in another implementation of the invention are provided as an article of manufacture, i.e., a computer storage medium containing a computer program of instructions for performing the above described steps.

In a machine implementation of the invention, an apparatus for setting and getting debug flags in a computer has a parse module, a search module, and a write module. The parse module parses a debugging message from an application program into a name field and a value field. The search module searches a debug symbol table for a name matching the name field from the debugging message, the debug symbol table having a plurality of debug symbol entries with each entry having a name and a debug symbol address of a storage location for the debug symbol corresponding to the name. The write module writes the value field from the debugging message into the storage location of the debug symbol address whose name matches the name field whereby the value field is reported to a software module at the application level.

Still another utility of the present invention is to permit a software developer to set, in real time, the state of a debug flag so as to externally enable or disable a feature, code section, or function of the software under development.

Still another utility of the present invention is to permit a software developer to examine the values of variables or expressions maintained by the software under development.

Still another utility of the present invention is to permit a user to enable or disable particular functions performed by the software modules of the operating system. These changes could be externally made in real time.

The foregoing and other useful features and advantages of the invention will be apparent from the following more particular description of a preferred embodiment of the invention as illustrated in the accompanying drawings.

BRIEF DESCRIPTION OF DRAWINGS

FIG. 6, composed of FIGS. 6A through 6B, illustrates the logical operations of the present invention at the application level and at the level of the operating system.

DETAILED DESCRIPTION OF PREFERRED EMBODIMENTS

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of computing system implementing the invention. Accordingly, the logical operations making up the embodiments of the invention described herein are referred to variously as operations, steps, or modules.

The present invention provides a software developer with the ability to examine and set debug flags, as well as control the operation of software modules under development without the need for any additional debugging software conventionally used. In particular, development of device drivers or operating system modules is facilitated under the present invention by providing the module under development with the ability to enable, disable or report debug symbols maintained in a debug symbol table within the module. An application program can be written to permit the software developer to generate and transmit debugging messages from the application program to the software modules under development.

Figure 3:
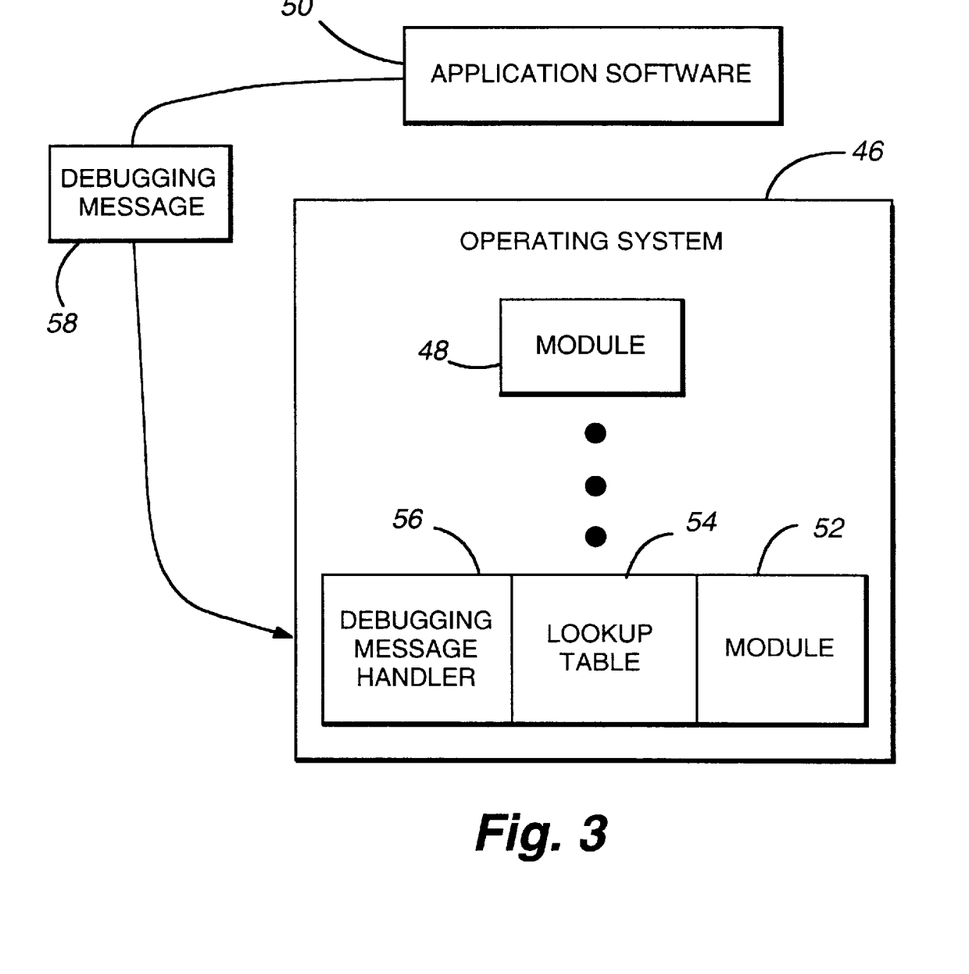
FIG. 3 illustrates the interaction between an application program and a software module under development in accordance with the present invention.

Referring to FIG. 3, operating system 46 contains modules 48 and module 52. Module 52 represents the software module being developed by the programmer. In a preferred embodiment of the present invention, module 52 is provided with table 54 and debugging message handler 56 so that application program 50 can communicate through debugging message 58 to module 52 for debugging purposes. The operation of application program 50 and module 52 with debugging message handler 56 and table 54 are explained in greater detail in FIGS. 6A–6B.

Figure 4:
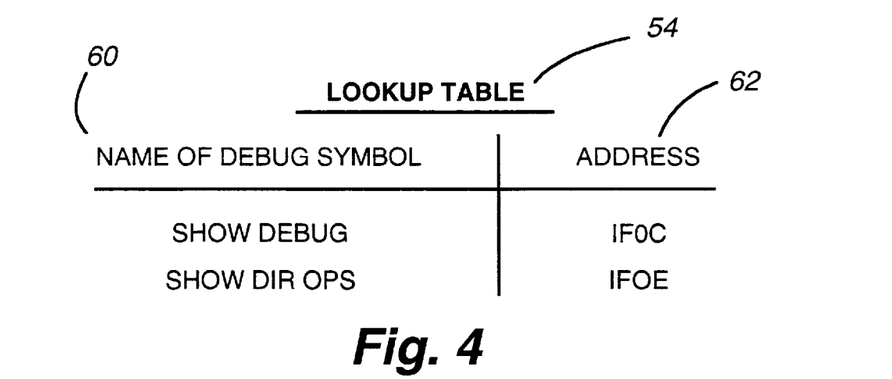
FIG. 4 illustrates the debug symbol table of the present invention.

FIG. 4 shows the debug symbol table 54 which is maintained within software module 52. Table 54 contains a first column 60 for storing the name of the debug name or symbol, and a second column 62 which contains the memory address 62 of the corresponding debug symbol. Table 54 is maintained within module 52 so that during software development of module 52, the developer can identify and create debug symbols which will be accessible by an application program, as shown in FIG. 3.

The contents of the debug symbols maintained in table 54 could be binary symbols indicating the state of a variable, or could take on numeric value depending on the application. Furthermore, the debug symbols could be used as read only symbols, read/write symbols, or commands to enable or disable a particular function implemented by module 52.

Figure 5:
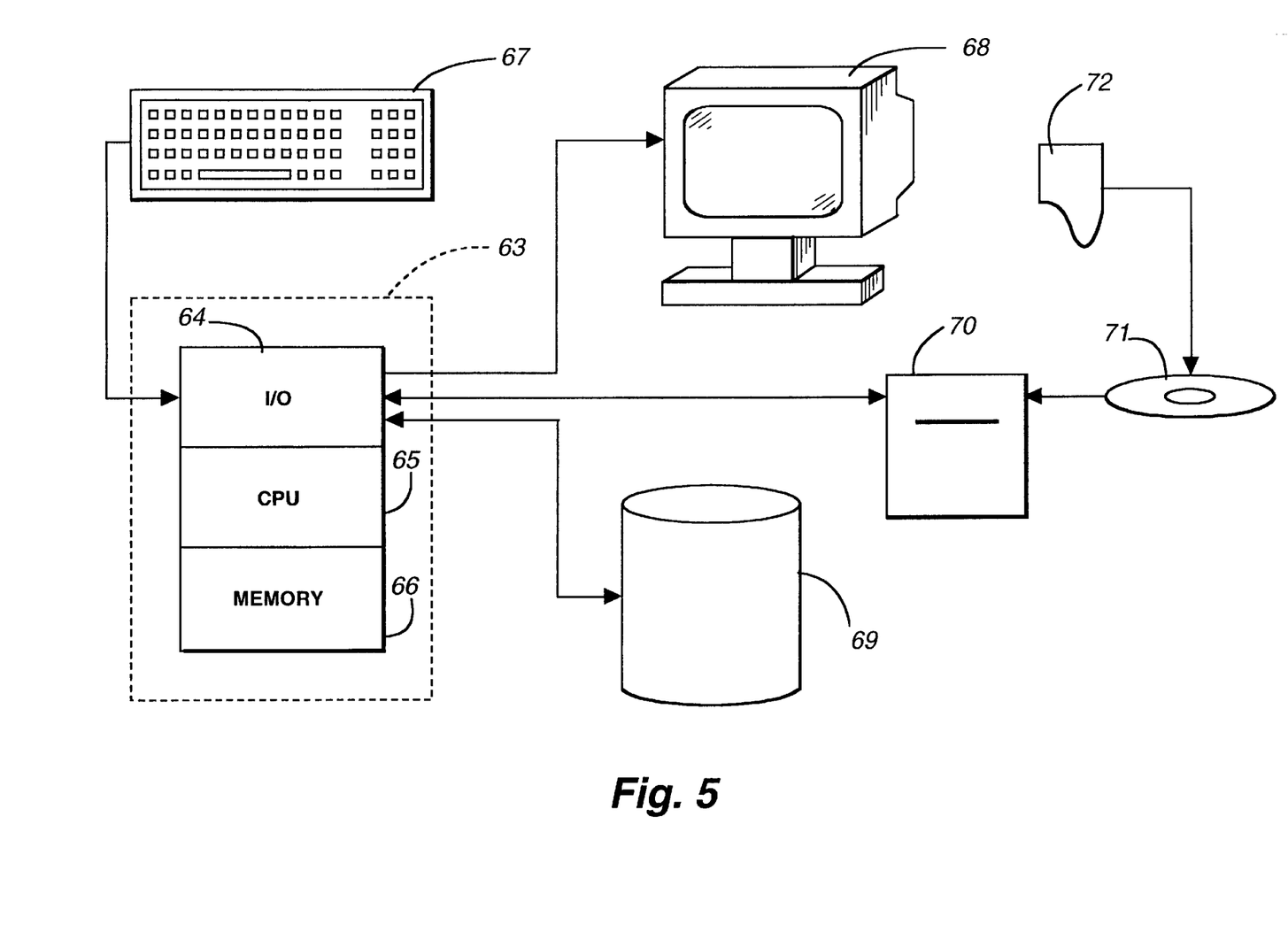
FIG. 5 illustrates a computing system to perform the computer implemented steps in accordance with the invention.

The operating environment in which the present invention is used encompasses the general distributed computing system, wherein general purpose computers, workstations, or personal computers are connected via communication links of various types, in a client-server arrangement, wherein programs and data, many in the form of objects, are made available by various members of the system. Some of the elements of a general purpose workstation computer are shown in FIG. 5, wherein a processor 63 is shown, having an input/output (I/O) section 64, a central processing unit (CPU) 65 and a memory section 66. The I/O section 64 is connected to a keyboard 67, a display unit 68, a disk storage unit 69 and a CD-ROM drive unit 70. The CD-ROM unit 70 can read a CD-ROM medium 71 which typically contains programs 72 and data. The computer program products containing mechanisms to effectuate the apparatus and methods of the present invention may reside in the memory section 66, or on a disk storage unit 69, or on the CD-ROM 8 of such a system. Examples of such systems include SPARC systems offered by Sun Microsystems, Inc., personal computers offered by IBM Corporation and by other manufacturers of IBM-compatible personal computers, and systems running the UNIX operating system or Solaris™ operating system.

Figure 6A:
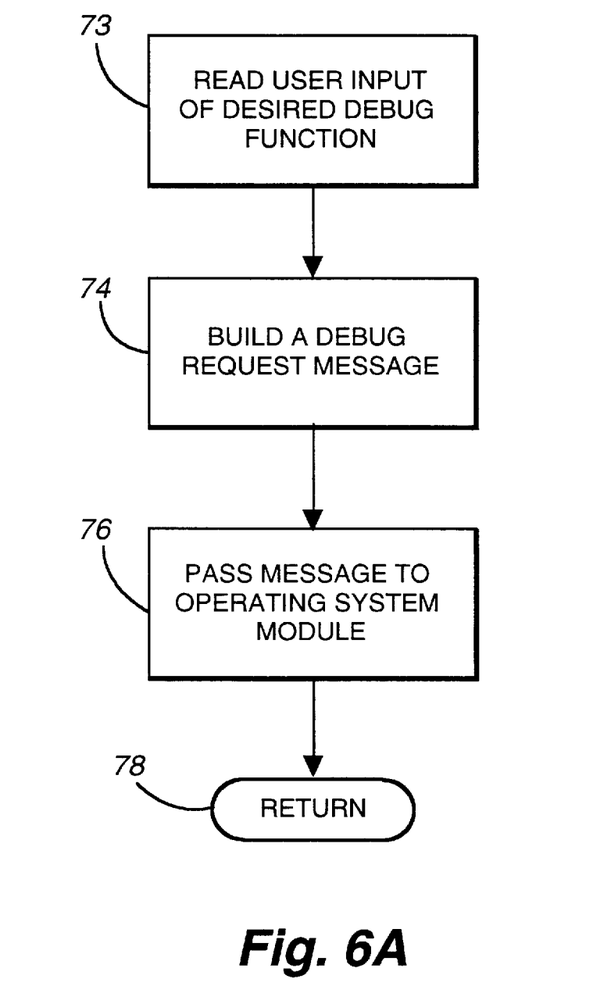

FIG. 6A illustrates the operations performed at the application level to generate debugging message 58 to be transmitted to the VxD model 52 under development. The application level software is responsive to user inputs of debugging requests for debugging commands. For instance, the user could request that the Vxd module report the value or state of a particular variable or flag. Alternatively, the user could request that the operating system module disable a particular feature or function contained therein (i.e., disable/enable file caching). The application level program therefore provides the user interface with debugging capabilities needed to develop the software module. The format of the user interface of the application level software is a matter of choice based on the functions which are needed by the particular software developer.

Operation 73 of FIG. 6A, at the application level software, reads the user input of the desired debugging function to be performed. Based on the user's request, operation 74 builds an appropriate debug request debugging message 58, as shown in FIG. 3.

According to the preferred embodiment of the present invention, the debugging request message is comprised of three data fields. Debugging message 58 contains a name field 86 (FIG. 6B), a separator field 88, and a value field 90. Name field 86 identifies the variable or function which is correspondingly maintained in table 54 so that the application level software, responsive to the software developer's request, can identify the variable or function to be reported or changed. Separator field 88 contains data indicating the operation to be performed. For instance, separator field 88 contains information indicating that a particular name field 86 should be reported or set. Value field 90 contains data indicating the desired value to which the name field 86 should be affected based on the data contained in separator field 88. As previously mentioned, the value field 90 could be a binary digit or a real value. The particular format of debugging message 58 will vary based upon the operating system in which the present invention is implemented. For instance, the message length and the size of a data byte, as well as any required message headers or other format requirements, will be dependent upon the particular operating system.

Upon building the message appropriately, the application level software at operation 76 in FIG. 6A passes debugging message 58 (FIG. 3) to the operating system module under development. Again, the method by which application level software transmits the debugging message 58 to module 52 is dependent upon the particular operating system in which the present invention is used. For instance, in a Windows 3.1 or 3.11 environment, the application level software would transmit data to the VxD module through the use of a call to the address returned by interrupt INT 2F. In Windows 95, the application level software would pass the debugging message 58 to the VxD module through the use of Microsoft's standard DeviceIOControl() interface. In Unix-based operating systems, the I/O control function, known as IOCTL(), would be used to pass down debugging message 58 to the module under development.

Debugging message 58 can be passed by the application program to module 52 while module 52 is running. Therefore, the preferred embodiment of the present invention provides the software developer with real time external control of the operation of module 52. Additionally, the software developer can obtain real time status information from module 52 while the module is in actual operation. These debugging features of the present invention are achieved without the use of any external conventional debugging tool kits.

Figure 6B:
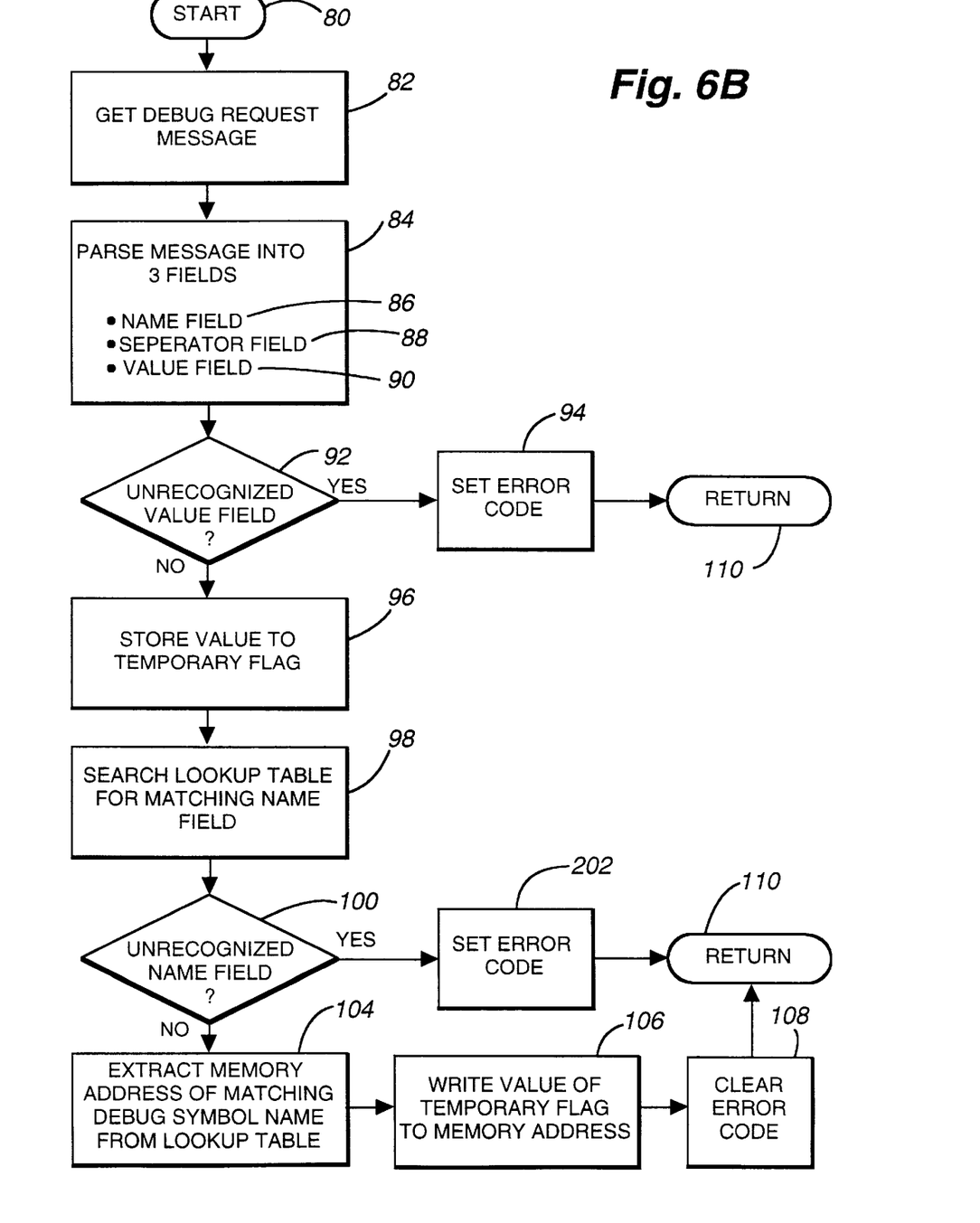

FIG. 6B illustrates the logical operations performed by debugging message handler 56 contained within module 52. Debugging message handler 56 is responsible for receiving and decoding debugging message 58 from application program 50. As shown in FIG. 3, debugging message handler 56 accesses table 54 in processing debugging message 58. The debugging message handler then passes the appropriate information to module 52 so that the appropriate action can be taken by the module under development.

At operation 82 in FIG. 6B, debugging message handler 56 retrieves the debugging request message 58. Debugging message 58 is then parsed into its three data fields at operation 84. If value field 90 is unrecognized by the debugging message handler at decision operation 92, the debugging message handler sets an error code at operation 94 to be reported to the application level program. If operation 92 recognizes value field 90, the handler stores the value field to a temporary register or flag at operation 96.

Using the name field data 86, search module 98 searches through table 54 for a matching name field. The particular search technique employed is a matter of choice dependent upon the expected size of table 54 and the desired performance of the search. At decision operation 100, the debugging message handler sets an error code at operation 102 if the received name field does not correspond to a name field contained within table 54. This error message is also reported back to the application software.

If operation 100 does find a matching name field in table 54, then operation 104 extracts the memory address 62 contained within table 54 corresponding to the matching debug symbol name. At operation 106, the debugging message handler writes the value of the temporary flag or register to the appropriate memory address obtained from table 54 corresponding to the matching debug symbol name. In this manner, the debugging message handler has decoded debugging message 58 and passed the appropriate information to module 52. Module 52 then operates on the information in a manner dependent upon the operations contained within module 52. At operation 108, the debugging message handler clears the error code so that the application level program is aware of the success of the debugging operation.

While the invention has been particularly shown and described with reference to preferred embodiments thereof, it will be understood by those skilled in the art that various other changes in the form and details may be made therein without departing from the spirit and scope of the invention.

What is claimed is:

1. Apparatus for reporting debug value fields in an operating system in a computer, the computer having a processor, an input/output device, and a data storage device, said operation system operating the processor and controlling the data storage device, said processor having a central processing unit, memory and input/output control, said input/output control connected to the input/output device and the data storage device, said apparatus comprising:

parse means for parsing a debugging message from an application program, the debugging message having a name field and a value field;

a debug symbol table having a plurality of debug symbols with each table entry having a name and a debug symbol address of a storage location for the debug symbol corresponding to the name;

search means for searching the debug symbol table for a name matching the name field from the debugging message; and write means for writing the value field from the debugging message into the storage location of the debug symbol address whose name matches the name field whereby the value field is reported.

2. The apparatus of claim 1 and in addition:

build means in the application program for building the debugging message from user input of a desired debug function.

3. The apparatus of claim 1 and in addition:

storage means for storing the value field from the debugging message in a temporary storage; and said write means retrieving the value field from the temporary storage and writing the retrieved value field into the storage location of the debug symbol address whose name matches the name field.

4. In a computing system having a processor, an operating system, and a memory, said operating system controlling said processor, said operating system comprised of a plurality of modules of software, a method for externally monitoring the real-time operation of a module of the operating system so that the module can be debugged by a software developer using an application-level interface, said method comprising the computer implemented steps of:

maintaining a table, in said module, of debugging flags for examination, each one of said debugging flags having a state and a location in the memory, said table mapping each one of said debugging flags to the location of the debugging flag in the memory;

passing a debugging message from said application level interface to the module, said debugging message directing the module to report the state of one of said debugging flags;

receiving said debugging message in said module;

decoding said debugging message in said module; and reporting the state of one of said debugging flags to the application-level interface responsive to said debugging message.

5. The method of claim 4, wherein the step of passing a debugging message from said application-level interface to the module, further comprises:

reading user input of a debugging flag to be requested from the module;

building a debugging message based on said user input, said debugging message having a name field and a value field, said name field for identifying one of said debugging flags, said value field for indicating that the state of said debugging flag corresponding to said name field should be reported by the module; and transmitting said debugging message from the application-level interface to the module for processing therein.

6. The method of claim 4, wherein the step of decoding said debugging message in said module, further comprises:

parsing in the module the debugging message into a name field and a value field, said name field identifying the debugging flag requested by the application-level interface, said value field for indicating that the state of said debugging flag corresponding to said name field should be reported by the module.

7. The method of claim 6, further comprising the steps of:

comparing the name field, parsed from the debugging message, to each debugging flag maintained in said table;

if no debugging flags in the table match the name field, then reporting an error code to the application-level interface; if a debugging flag in the table matches the name field, accessing the table to determine the location of the debugging flag in the memory; and writing the value field to the location of the debugging flag in the memory.

8. The method of claim 7, wherein the step of writing the value field to the location of the debugging flag in memory, further comprises:

comparing the value field, parsed from the debugging message, to a set of valid value fields maintained in the module; and if the value field does not match one of said valid value fields maintained in the module, then reporting an error code to the application-level interface.

9. In a computing system having a processor, an operating system, and a memory, said operating system controlling said processor, said operating system comprised of a plurality of modules of software, a method for externally altering the real-time operation of a module of the operating system so that the module can be debugged by a software developer using an application-level interface, said method comprising the computer implemented steps of:

maintaining a table, in said module, of debugging flags for examination, each one of said debugging flags having a state and a location in the memory, said table mapping each one of said debugging flags to the location of the debugging flag in the memory;

passing a debugging message from said application level interface to the module, said debugging message directing the module to alter the state of one of said debugging flags;

receiving said debugging message in said module;

decoding said debugging message in said module; and altering the state of one of said debugging flags to the application-level interface responsive to said debugging message.

10. The method of claim 9, wherein the step of passing a debugging message from said application-level interface to the module, further comprises:

reading user input of a debugging flag of the module to be altered;

building a debugging message based on said user input, said debugging message having a name field and a value field, said name field for identifying one of said debugging flags, said value field for indicating the value to which the state of said debugging flag corresponding to said name field should be altered; and transmitting said debugging message from the application-level interface to the module for processing therein.

11. The method of claim 9, wherein the step of decoding said debugging message in said module, further comprises:

parsing in the module the debugging message into a name field and a value field, said name field identifying the debugging flag requested by the application-level interface for alteration, said value field for indicating that the state of said debugging flag corresponding to said name field should be altered.

12. The method of claim 11, further comprising the steps of:

comparing the name field, parsed from the debugging message, to each debugging flag maintained in said table;

if no debugging flags in the table match the name field, then reporting an error code to the application-level interface; if a debugging flag in the table matches the name field, accessing the table to determine the location of the debugging flag in the memory; and writing the value field to the location of the debugging flag in the memory.

13. The method of claim 12, wherein the step of writing the value field to the location of the debugging flag in memory, further comprises:

comparing the value field, parsed from the debugging message, to a set of valid value fields maintained in the module; and if the value field does not match one of said valid value fields maintained in the module, then reporting an error code to the application-level interface.

14. A computer program storage medium readable by a computing system and encoding a computer program of instructions for executing a computer process for externally monitoring the real-time operation of a module of the operating system so that the module can be debugged by a software developer using an application-level interface, said computer process comprising the steps of:

maintaining a table, in said module, of debugging flags for examination, each one of said debugging flags having a state and a location in the memory, said table mapping each one of said debugging flags to the location of the debugging flag in the memory;

passing a debugging message from said application level interface to the module, said debugging message directing the module to report the state of one of said debugging flags;

receiving said debugging message in said module;

decoding said debugging message in said module; and reporting the state of one of said debugging flags to the application-level interface responsive to said debugging message.

15. The computer program storage medium of claim 14 wherein the computer process in computer program step of decoding said debugging message in said module comprises the step of:

parsing in the module the debugging message into a name field and a value field, said name field identifying the debugging flag requested by the application-level interface, said value field for indicating that the state of said debugging flag corresponding to said name field should be reported by the module.

16. The computer program storage medium of claim 15 where said computer process in the computer program further comprises the steps of:

comparing the name field, parsed from the debugging message, to each debugging flag maintained in said table;

if no debugging flags in the table match the name field, then reporting an error code to the application-level interface; if a debugging flag in the table matches the name field, accessing the table to determine the location of the debugging flag in the memory; and writing the value field to the location of the debugging flag in the memory.

\* \* \* \* \*